United States Patent
Dan et al.

(10) Patent No.: US 8,589,863 B2
(45) Date of Patent: Nov. 19, 2013

(54) CAPTURING INFORMATION ACCESSED, UPDATED AND CREATED BY SERVICES AND USING THE SAME FOR VALIDATION OF CONSISTENCY

(75) Inventors: Asit Dan, Pleasantville, NY (US); Claus T. Jensen, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 12/332,606

(22) Filed: Dec. 11, 2008

(65) Prior Publication Data

US 2010/0153906 A1 Jun. 17, 2010

(51) Int. Cl.
*G06F 9/44* (2006.01)

(52) U.S. Cl.
USPC .............................. 717/104; 717/107; 717/126

(58) Field of Classification Search
USPC ..................... 717/101–178; 703/1–21, 25, 27; 705/348; 709/204, 223
See application file for complete search history.

(56) References Cited

U.S. PATENT DOCUMENTS

| | | | |
|---|---|---|---|
| 5,946,694 A * | 8/1999 | Copeland et al. ..................... 1/1 |
| 6,023,578 A * | 2/2000 | Birsan et al. .................. 717/105 |
| 6,028,997 A | 2/2000 | Leymann et al. ............. 717/104 |
| 6,308,224 B1 | 10/2001 | Leymann et al. ............. 719/310 |
| 6,360,223 B1 * | 3/2002 | Ng et al. ............................... 1/1 |
| 6,393,386 B1 * | 5/2002 | Zager et al. ..................... 703/25 |
| 6,907,395 B1 | 6/2005 | Hunt et al. ..................... 703/21 |
| 7,031,901 B2 * | 4/2006 | Abu El Ata ..................... 703/21 |
| 7,181,694 B2 * | 2/2007 | Reiss et al. ..................... 715/747 |
| 7,219,327 B1 | 5/2007 | Jacobs et al. .................. 717/104 |
| 7,313,782 B2 | 12/2007 | Lurie et al. ..................... 717/104 |
| 7,331,035 B2 | 2/2008 | Loos et al. ..................... 717/104 |
| 7,458,062 B2 * | 11/2008 | Coulthard et al. ............. 717/121 |
| 7,503,032 B2 * | 3/2009 | Bhaskaran et al. ........... 717/104 |
| 7,506,302 B2 * | 3/2009 | Bahrami ....................... 717/100 |
| 7,568,019 B1 * | 7/2009 | Bhargava et al. ............. 709/223 |
| 7,631,291 B2 | 12/2009 | Shukla et al. ................. 717/107 |
| 7,703,071 B2 * | 4/2010 | Kuester et al. ................. 717/104 |
| 7,895,568 B1 * | 2/2011 | Goodwin et al. ............. 717/108 |
| 7,917,889 B2 | 3/2011 | Devarakonda et al. ....... 717/104 |
| 8,271,252 B2 * | 9/2012 | Chatterjee et al. .............. 703/13 |
| 2003/0009433 A1 * | 1/2003 | Murren et al. ..................... 707/1 |
| 2003/0033182 A1 | 2/2003 | Stok et al. .......................... 705/7 |
| 2004/0031015 A1 | 2/2004 | Ben-Romdhane et al. ... 717/107 |

(Continued)

OTHER PUBLICATIONS

Extending Document Management Systems with User-Specific Active Properties—Paul Dourish, W. Keith Edwards, Anthony Lamarca, John Lamping, Karin Petersen, Michael Salisbury, Douglas B. Terry, and James Thornton—Xerox Palo Alto Research Center—ACM Transactions on Information Systems, vol. 18, No. 2, Apr. 2000.*

(Continued)

*Primary Examiner* — Lewis A Bullock, Jr.
*Assistant Examiner* — Francisco Aponte
(74) *Attorney, Agent, or Firm* — Steven Chiu; Ido Tuchman

(57) ABSTRACT

Techniques for extending a service model with specification of information consumed. The service model includes specification of at least one exposed interface. A receiving operation receives specification of information consumed by a service implementation of the service model. The information consumed is information that is or needs be utilized by the service implementation without being passed through the exposed interface. A generating operation automatically generates an extended service model using a computer processor. The extended service model includes specification of the exposed interface and specification of the information consumed by the service implementation.

18 Claims, 4 Drawing Sheets

(56) References Cited

U.S. PATENT DOCUMENTS

| | | | |
|---|---|---|---|
| 2004/0078777 A1* | 4/2004 | Bahrami | 717/105 |
| 2004/0153992 A1 | 8/2004 | Molina-Moreno et al. | 717/105 |
| 2006/0206863 A1 | 9/2006 | Shenfield et al. | 717/107 |
| 2007/0006134 A1* | 1/2007 | Larvet et al. | 717/104 |
| 2007/0038492 A1 | 2/2007 | Ryan et al. | 705/8 |
| 2007/0088598 A1* | 4/2007 | Challapalli et al. | 705/10 |
| 2007/0245297 A1* | 10/2007 | Kuester et al. | 717/104 |
| 2007/0255720 A1 | 11/2007 | Baikov | 707/10 |
| 2008/0059945 A1 | 3/2008 | Sauer et al. | 717/105 |
| 2008/0127047 A1* | 5/2008 | Zhang et al. | 717/104 |
| 2008/0127049 A1* | 5/2008 | Elaasar | 717/104 |
| 2008/0134135 A1* | 6/2008 | Elaasar | 717/104 |
| 2009/0007056 A1* | 1/2009 | Prigge et al. | 717/104 |
| 2009/0113378 A1* | 4/2009 | Boyer et al. | 717/101 |
| 2009/0113394 A1* | 4/2009 | Weber et al. | 717/126 |
| 2009/0171720 A1 | 7/2009 | Crook et al. | 705/7 |
| 2009/0172691 A1 | 7/2009 | Barros et al. | 718/104 |
| 2009/0183138 A1 | 7/2009 | Loos et al. | 717/105 |
| 2009/0198639 A1 | 8/2009 | Narayanaswamy et al. | 706/48 |
| 2010/0037201 A1* | 2/2010 | Salle et al. | 717/104 |

OTHER PUBLICATIONS

International Search Report for PCT/EP2009/066927, pp. 1-12 (Apr. 8, 2010).

Anonymous: "Computer-aided software engineering" Wikipedia, The Free Encyclopedia, [Online] Nov. 14, 2008, XP002570153 Retrieved from the Internet: URL:http://en.wikipedia.org/w/index.php?title=Computer-aided_software_engineering&oldid=251783793> [retrieved on Feb. 24, 2010].

Anonymous: "Data modeling" Wikipedia, The Free Encyclopedia, [Online] Dec. 8, 2008 , pp. 1-8, XP002570146 Retrieved from the Internet: URL:http://en.wikipedia.org/w/index.php?title=Data_modeling&oldid=256726581> [retrieved on Feb. 24, 2010].

Alexander F. Egyed, Automatically Validating Model Consistency during Refinement, Computer Science Department University of Southern California, 2001, pp. 2-8.

Peter Burns, Validation of Consumer Credit Risk Models, 2004, pp. 7-11.

Richard G. Hills, Statistical Validation of Engineering and Scientific Models: Background, Departments of Mechanical Engineering New Mexico State University, 1999, pp. 41-56.

Christopher J. Pavlovski and Joe Zou, Non-Functional Requirements in Business Process Modeling, Copyright @ 2008, Australian Computer Society, Inc., vol. 79, Editors, pp. 1-10.

* cited by examiner

CAPTURING INFORMATION ACCESSED, UPDATED AND CREATED BY SERVICES AND USING THE SAME FOR VALIDATION OF CONSISTENCY

BACKGROUND OF THE INVENTION

1. Field of the Invention

The present invention relates to modeling and validating information consumed by services.

2. Description of Background

In the field of computer science, a service is a software system designed to support interoperable machine-to-machine interaction over a network. A service exposes external interfaces doing something meaningful and offers bindings that consumers bind to. A service can be described in terms of its external interactions using, for example, Web Services Description Language (see http://en.wikipedia.org/wiki/Web_Services_Description_Langu age). Services typically have a collection of ports with appropriate bindings and an optional detailed description of the interfaces in the port type. If available, interface descriptions include input and output descriptions.

A service modeling language, such as the Unified Modeling Language (see http://www.ibm.com/developerworks/rational/library/05/419_s oa/), models the basic service description. The description includes port type, interfaces and bindings, and optionally other services invoked by internal processing of the service. Modeling the internal invocation of other services is done for wiring or orchestration purposes only, without providing any way of analyzing service realization and information consumption aspects.

A process is a flow of activities (see http://en.wikipedia.org/wiki/Process). A Process modeling language, such as BPML or BPMN (see http://en.wikipedia.org/wiki/Business_Process_Modeling_Language), models the basic activity flow of a process as well as the input and output interface of that process.

A process execution modeling language, such as BPEL (see http://en.wikipedia.org/wiki/BPEL), in the context of SOA (Service-Oriented Architecture), models a process as an orchestration of humans and services. The process invokes services during its execution (often referred to as processes executing over services). Modeling the invocation of services is done for wiring or orchestration purposes only, without providing any way of analyzing information consumption aspects.

An information model (see http://en.wikipedia.org/wiki/Information_model) is an abstract, formal representation of information entities that includes their properties, relationships and the operations that can be performed on them. An information model is classically used in a data or information architecture context. An information model may be additionally used as a shared semantic context for definition of interfaces.

Current service and process modeling languages include the inputs and outputs of services and processes, however they do not take into account the additional information consumed internally by the services and processes. This lack of information representation can lead to information mismatch upon downstream assembly when, for some reason, appropriate information is not available. Current modeling mechanisms are unable to detect these issues, as they do not include the necessary model elements to perform information verification. The information mismatch issues may occur in both transactional and bulk processing contexts.

As can be seen above, information consumed by services and process is not part of current modeling approaches. Hence, currently there are no quantitative and qualitative control mechanisms for availability of information. Based on standard models there is no way to verify the balanced "equation" between services, processes and information needed to support business solutions. However, in order to avoid expensive rework, it is critical to detect an information mismatch problem before initiating assembly of the solution. The earlier such problems are identified, the less expensive they are to correct. Furthermore, a programmer should not have to figure out information consumption and information quality characteristics. Such characteristics are the concern of information architecture.

SUMMARY OF THE INVENTION

One aspect of the invention is a method for extending a service model. The service model includes specification of at least one exposed interface. A receiving step in the method receives specification of information consumed by a service implementation of the service model. The information consumed is information that is or needs to be utilized by the service implementation without being passed through the exposed interface.

The method further includes automatically generating an extended service model using a computer processor. The extended service model includes specification of the exposed interface and specification of the information consumed by the service implementation.

In one embodiment of the invention, the specification of the information consumed by the service implementation of the service model includes a consumption type of the information consumed. The consumption type specifies one or more function types performed on the consumed information. For example, consumption type may specify at least one of a creating the information consumed operation, a reading the information consumed operation, an updating the information consumed operation, and a deleting the information consumed operation performed by the service implementation.

A further embodiment of the invention includes non-functional annotation of the information consumed. For example, the non-functional annotation may include a quality criterion for the information consumed. The non-functional annotation may additionally or alternatively include a timing criterion for the information consumed specifying when the information consumed is required by the service implementation.

In another embodiment of the invention, the specification of the information consumed by the service implementation of the service model includes identification of at least one information source supplying the information consumed to the service implementation. Tools may be used to receive the various information consumed requirements of the service model and to automatically identify and allocate an information source meeting such requirements.

The method may also include an identifying step that identifies at least one information inconsistency in the extended service model if the information consumed by the service model implementation does not match at least one available information source for internal processing by the program components. Tools may be used to flag such information inconsistency and automatically correct the same by allocating a new information source satisfying the model requirements.

Another aspect of the invention is a computer program product embodied in a computer usable medium. For example, the computer program product may include one or more tools for modeling and validating information consumed by services. Computer readable program codes are coupled to the computer usable medium and are configured to cause the program to receive specification of information consumed by a service implementation of the service model, the information consumed being information that is or needs to be utilized by the service implementation without being passed through the exposed interface; and automatically generate an extended service model using a computer processor, the extended service model including specification of the exposed interface and specification of the information consumed by the service implementation.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-4.

Figure 1:
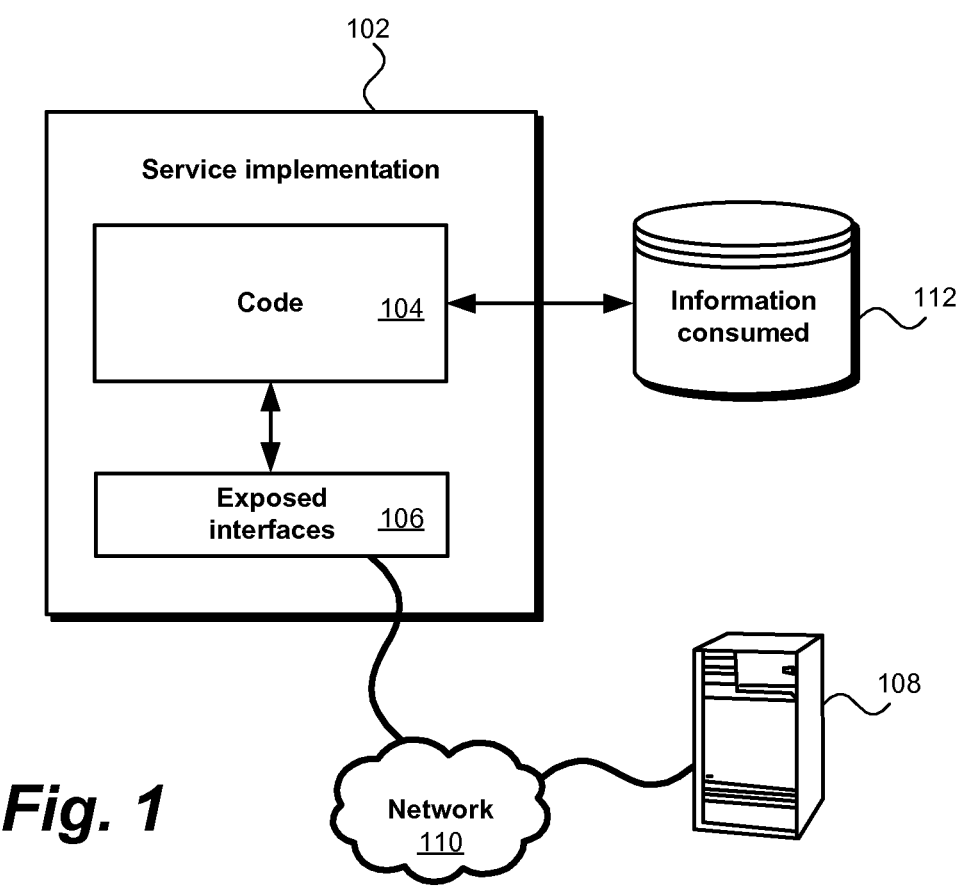
FIG. 1 shows an example of a service implementation modeled by the present invention.

Turning to FIG. 1, an example service implementation 102 modeled by an embodiment of the present invention is shown. As used herein, a service is a discretely defined set of contiguous and autonomous business or technical operations. The service implementation 102 includes code 104 for implementing the service's operation. The code 104 may be written in various programming or modeling languages known in the art. Such programming languages may include object oriented programming languages such as C++, Java or the like. The programming languages may also include conventional procedural programming languages, such as C, FORTRAN or the like. The modeling languages may also include service modeling languages like UML and other languages used to describe the implementation aspects of the service.

The service implementation 102 also includes exposed interfaces 106. An exposed interface is a published interface defining at least the input parameters passed to the service, the output parameters from the service, the operations that can be called, and how to invoke these operations. Thus, using the exposed interface 106, a service user 108 (human or machine) can pass input parameters and an operation call to the service implementation via a computer network 110.

The service, in performing its operation, can process additional information not being passed through the exposed interface, referred to herein as information consumed 112. For example, a flight reservation service may receive from the exposed interface parameters for flight origin, destination, and date. The service consumes additional information stored in an airline's database, such as flight times and seat availability.

Once the service's operation is completed, the service 102 returns output parameters through the exposed interface 106 back to service user 108 via the network 110. Thus, the flight reservation service can output available flights to the service user 108 as an output parameter through the network 110.

It is noted that the preceding discussion about the service implementation of FIG. 1 is greatly simplified for illustration purposes. Many service implementations are difficult to design and often require service modeling tools to facilitate their creation and modification. An embodiment of the present invention extends traditional service models to include specification of information utilized by the service implementation 102 without being passed through the exposed interface 108. The embodiment captures necessary information consumed 112 to architect and design a service.

Modeling this information requirement in accordance with the present invention is performed early to avoid rework and wasted effort. The invention can facilitate verification that service models are consistent from an information perspective, and that correct information is consumed and produced from a business perspective. The invention embodiment addresses necessary modeling and verification mechanisms to perform these actions, and can be used for early identification and correction of information mismatch issues. Information mismatch issues are also referred to herein as "information inconsistency."

In a particular embodiment of the invention, information inconsistency for services may occur through mismatch on available information sources for internal processing and mismatch on the information sent to or received from other services being invoked by the service implementation. Specifically, the information inconsistency may include such scenarios as no appropriate information source exists, the information source specified is incomplete compared to the information requirements, the quality of source information specified in the information requirements is unavailable, the information source is not available at the appropriate time specified by the information requirements and service model specifies multiple inconsistent information sources.

In accordance with an embodiment of the invention, the information consumed is integrated with service models. In a particular embodiment, a Service Information Consumption model component is added to conventional service models.

The Information Consumption models are used to verify information inconsistencies across the breadth of a business solution. To achieve precision and formal representation for the Information Consumption models, the models are based on the notion of information entities (based on an information model for a defined scope or portfolio of assets).

Figure 2A:
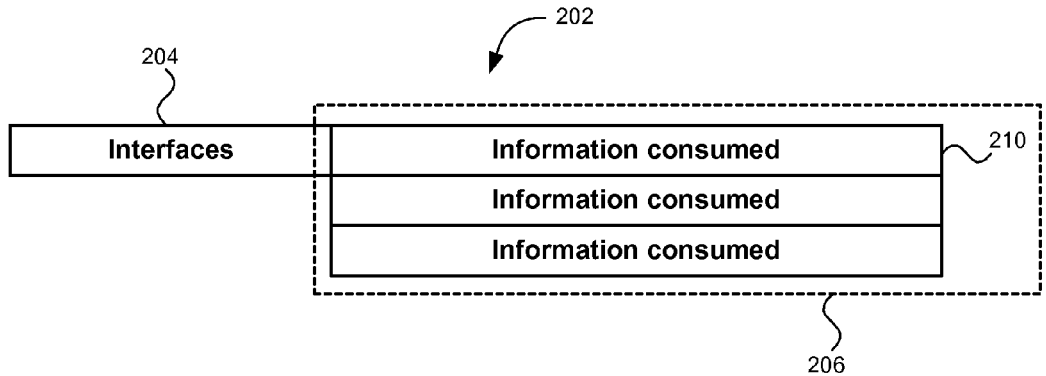
FIG. 2A illustrates one embodiment of a service model extended to provide a service information consumption model contemplated by the present invention.

Turning now to FIG. 2A, one embodiment of a service model 202 extended to provide a Service Information Consumption model contemplated by the present invention is shown. The service model 202 includes a specification of interfaces 204 available to a service user and a list 206 specifying information consumed 210 by the service.

As used herein, "information consumed" is defined as information that is accessed, updated, deleted and/or created by a service without being passed through an exposed interface of the service. The information consumed field 210 captures persistent and staged information accessed, updated, deleted and/or created by the service. The specification of information consumed 210 also captures information required from a business or execution perspective but not yet assigned to an information source. As discussed further below, by including a specification of information consumed 210 in the service model 202, the present invention can be beneficially used to detect information inconsistencies between a set of interconnected services and information sources early in the design process.

Information Consumption models are expressed using information entities in a similar fashion to their use in traditional Information models. Preferably, but not exclusively, the information entities are semantically based on a shared global information model for the solution in question. If the specification of information consumed 210 is based on a global information model, then the operations part of that information model can be used for additional validation of information sources, as discussed below.

Figure 2B:
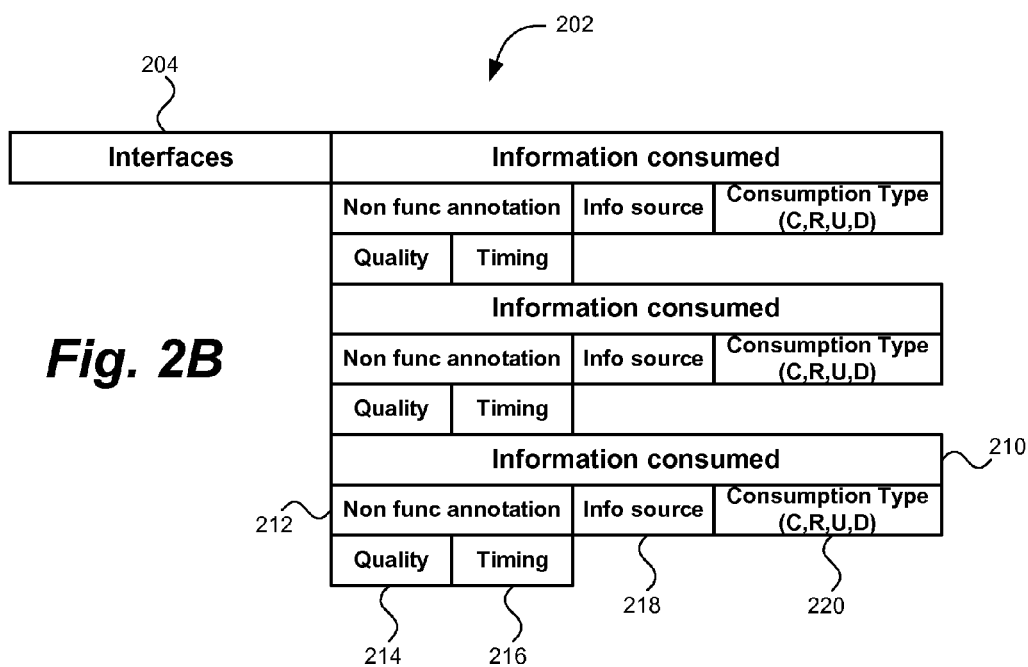
FIG. 2B illustrates another embodiment of a service model extended to provide a service information consumption model contemplated by the present invention.

In FIG. 2B, another embodiment of a service model 202 extended to include a Service Information Consumption model contemplated by the present invention is shown. This service model 202 provides, in addition to the information discussed above, nonfunctional annotations 212 for each information consumed 210. The nonfunctional annotations 212 may include, for example, a description of how particular consumed information is utilized by the service.

It is contemplated that the nonfunctional annotations 212 may consist of a specification of the quality 214 of the consumed information and the timing 216 that the consumed information should be available to the service. For example, a flight reservation service model may specify a degree of trustworthiness or a degree of staleness that an information source must satisfy in the quality field 214. Similarly, the service model may specify when data from the information source must be made available to the implementation in the timing field 216.

The service model 202 may optionally specify the information sources allocated for each information consumed 210 record. As discussed in more detail below, this field's value may be automatically generated by a software tool based on other requirements in the service model.

The service model 202 may additionally include a consumption type field 220. The consumption type 220 specifies one or more function types performed on the consumed information. For example, consumption type may specify at least one of a creating the information consumed operation, a reading the information consumed operation, an updating the information consumed operation, and a deleting the information consumed operation performed by the service implementation. It is noted that combinations of consumption type operations may be specified in the service model 202. For example, information may be read, updated and deleted by the service implementation.

It is contemplated that the information quality 214, timing 216, source 218, and consumption type 220 specifications can be used to further enhance the information consistency analysis.

The information consistency analysis checks the service models 202 against available information sources. Specifically, the information consistency analysis validates that assigned and available information sources can provide full support for the information consumed. In other words, information consistency analysis confirms that all information entities are available at one information source or another. For example, the analysis can confirm that the available information sources include information updated or read by the modeled services.

The information consistency analysis may further validate that available information sources have appropriate quality and timing characteristics. As mentioned above, it may be the case that the information consumed must be of a particular quality or be available at a particular time of execution. The consistency analysis can be used to verify such scenarios and reveal architectural flaws that fail to satisfy the information quality and/or information timing design requirements. The information consistency analysis can also validate that information entity operations (based on an Information model) match information consumed characteristics. For instance, the analysis can verify whether the specified consumption type (create, read, update, and/or delete operations) is permitted by an allocated information source. Finally, the analysis can update and enrich metadata with information sources based on the specified information consumed 210. This action can include assigning information sources 218 to service information consumption models as they are discovered and applied.

Another embodiment of the invention includes extended software tools that support the Service Information Consumption models. For example, the software tools can include capabilities to annotate service models with Service Information Consumption models. The tools may provide an editor, such as a text editor or a graphical editor, allowing a designer to incorporate the Service Information Consumption models with conventional Service-Oriented Architecture models. A text editor can, for instance, allow the user to markup text fields specifying the information consumed, information quality and information timing requirements of a service design. A graphical editor may, for example, allow users to drag-and-drop various service templates containing specifications for information consumed onto a graphical workspace.

It is further contemplated that the software tools may be capable of validating the information consistency of services. As mentioned above, the software tools may, for example, extend service modeling methods by analyzing and validating persistent and/or staged information accessed, updated and created by a service. Thus, in addition to tracking endpoints consumed under classical service modeling, the software tools can analyze the information sources consumed (accessed, updated or created) by the service. Furthermore, when information quality and timing characteristics are specified in the model, the analysis can verify that applicable information entities matching such information specification are available to the service.

As mentioned, the software tools may analyze information required to execute the service, including information not yet assigned to information sources and non-functional characteristics. The analysis can further determine if required information entities to be consumed can be found from available information sources, and if so, can be automatically allocated to the information entities as an information source 218.

The tools may also, automatically or manually, allocate information sources to services based on information characteristic rules. For example, if the service model requires a particular information quality of the information consumed, the software tool can select from among a plurality of available information sources an entity capable of satisfying the required information quality, if one exists. The software tools can also be used to fulfill information timing requirements in a similar fashion.

It is additionally contemplated that the software tools can validate service models against information inconsistencies. The validation can, for example, check whether a required information source does not exist, an information source provides incomplete information, information is unavailable at the appropriate time from the information source, and if multiple inconsistent information sources exist.

Figure 3:
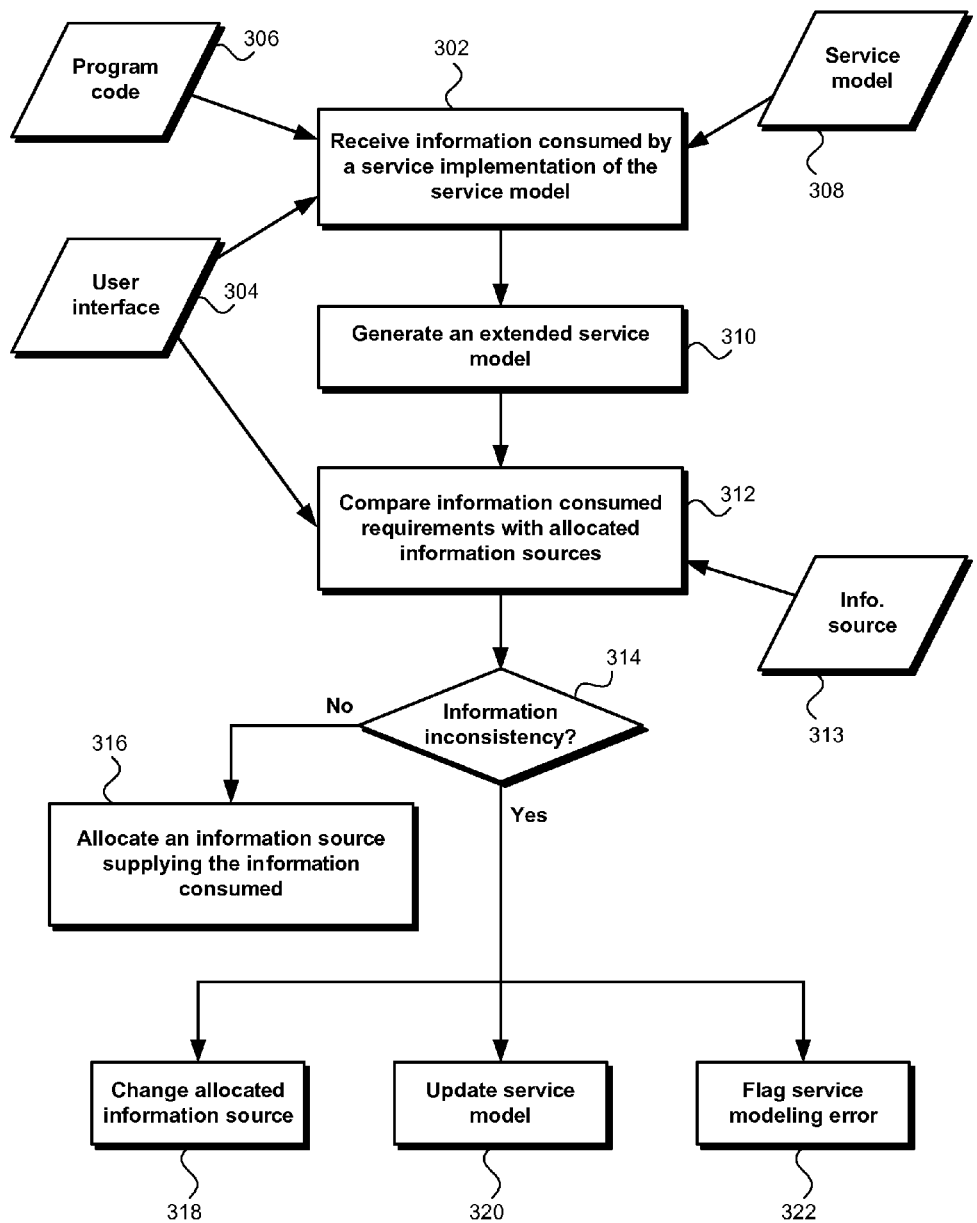
FIG. 3 shows one possible flowchart of computer implemented operations for modeling a computer program in accordance with the present invention.

Turning now to FIG. 3, one possible flowchart is shown illustrating a computer implemented operations for extending a service model, as contemplated by the present invention. The service model to be extended includes specification of at least one exposed interface.

The operations begin with receiving operation 302. During the receiving operation 302, specification of information consumed by a service implementation of the service model is received. The information consumed by the service implementation is information utilized by the service implementation without being passed through the exposed interfaces.

Specification of information consumed by the service implementation can include consumption type, non-functional annotation of the information consumed and specification of information sources. The non-functional annotation may include a quality criterion for the information consumed by the service implementation. The non-functional annotation may also include a timing criterion for the information consumed specifying when the information consumed is required by the service implementation.

It is contemplated that the information consumed by the service implementation can be received by human input. In a particular embodiment of the invention, a user interface 304 is provided to assist human annotation of information aspects of service models. Such a user interface 304 can be an extension of existing modeling tools.

In a further embodiment of the invention, the information consumed by the service implementation can be received by tool assisted analysis. In a particular embodiment of the invention, the tool assisted analysis automatically determines the information consumed by the service implementation by examination of the service implementation. Such analysis can include analyzing program code 306 in the service implementation for information transfers outside the exposed interface. For example, the tool may analyze SQL queries against structured data in relational databases. The tool may additionally analyze queries against unstructured data using existing capabilities of incorporating unstructured data in the information fabric.

In another embodiment of the invention, information consumed can be automatically received by analyzing service models 308. For example, tool assisted analysis can traverse internal service invocations and either report the information findings or incorporate them in the higher level Information Consumed models of the orchestrating service. Note that traversing service invocations hierarchically, and synthesizing information consumed through those bindings, is only possible if the invoked services are in fact correctly annotated with input and output information entities. Syntactical input and output parameters are not enough; the information entities going in to and out of the invocation must be deducible, hence there is a recursive property applied in a hierarchical structure of interacting services.

At generating operation 310, an extended service model is automatically generated for the service. The extended service model includes the specification of the exposed interface and specification of the information consumed by the service implementation. After completion of generating operation 310, control passes to comparing operation 312.

At comparing operation 312, the extended service model is compared against allocated and available information sources to identify any information inconsistencies. Information inconsistency occurs when information consumed by the service implementation does not match at least one allocated or available information source for consumed information.

It is contemplated that information source capabilities may be received via human input through the user interface 304, or from analysis of allocated and available information sources 313 known to the modeling tool. This step may also capture any non-functional aspects of the information sources, such as the quality criterion and timing criterion of the information. Again, the non-functional information may be obtained through the user interface 304 or from analysis of allocated information sources 313.

After completion of comparing operation 312, control passes to identifying operation 314. The identifying operation 314 determines if any information inconsistency exists between the extended service model and allocated and available information sources. As discussed above, information inconsistency may occur through such scenarios as no source information specified in the model exists, the source specified in the model is incompletely available, the quality of information specified in the model is unavailable, and model specifies multiple inconsistent information sources.

In one configuration of the invention, information mismatch problems are detected early. For example, identification of at least one information inconsistency in the service model is performed before substantial source code for the service implementation is written. The earlier information mismatch problems are identified, the less expensive they are to correct. Furthermore, a programmer should not have to figure out information consumption and information quality characteristics. Such characteristics are the concern of information architecture. If no information inconsistency is identified, control passes to allocating operation 316.

At allocating operation 316, at least one information source for internal processing by the service implementation is automatically or manually allocated based, at least in part, on the information consumed by the service implementation. Of course not all information entities represent persistent information, but for those that do there is value to assign as metadata the actual information source that is to be accessed for each persistent information entity.

On the other hand, if identifying operation 314 finds the existence of one or more information inconsistencies between the extended service model and allocated and available information sources, several possible operations may be taken to correct the inconsistency. For example, control may pass to allocating operation 318, where a different information source is allocated to the service meeting the extended service model requirements. Allocating operation 318 can be performed manually through the user interface or automatically by the modeling tool.

Alternatively, the service model may be updated at updating operation 320 to meet the limitations of the allocated information sources. This operation can also be performed manually through the user interface. Once the service model is updated, the modeling tool can once again return to comparing operation 312 iteratively search for further information inconsistencies. Finally, the modeling tool may simply alert the user that service modeling error has been found at flagging operation 322. The user would have the option to correct the information inconsistency or not.

Another aspect of the invention is directed to embodiments that can be embodied in the form of computer-implemented processes and apparatuses for practicing those processes, which is now described with reference to FIG. 4. For example, the computer implemented operations for modeling a computer program are embodied in computer program code executed by computer processors.

Figure 4:
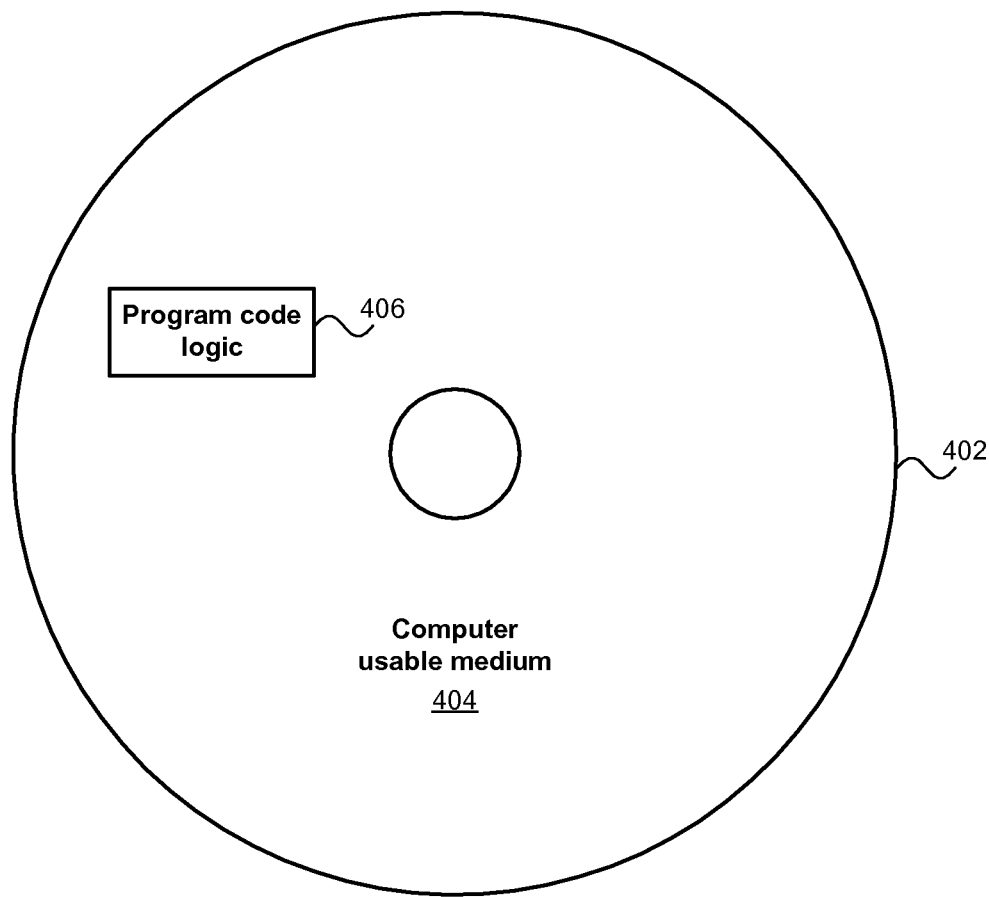
FIG. 4 depicts one embodiment of an article of manufacture incorporating one or more aspects of the invention.

Embodiments include a computer program product 402 as depicted in FIG. 4 on a computer usable medium 404 with computer program code logic 406 containing instructions embodied in tangible media as an article of manufacture.

Exemplary articles of manufacture for computer usable medium 404 may include floppy diskettes, CD-ROMs, hard drives, universal serial bus (USB) flash drives, or any other computer-readable storage medium, wherein, when the computer program code logic 406 is loaded into and executed by a computer, the computer becomes an apparatus for practicing the invention.

Embodiments include computer program code logic 406, for example, whether stored in a storage medium, loaded into and/or executed by a computer, wherein, when the computer program code logic 406 is loaded into and executed by a computer, the computer becomes an apparatus for practicing the invention. When implemented on a general-purpose microprocessor, the computer program codes configure the microprocessor to create specific logic circuits.

Additionally, at least one program storage device readable by a machine, tangibly embodying at least one program of instructions executable by the machine to perform the capabilities of the system 10 can be provided. The article of manufacture can be included as a part of a computer system or sold separately.

The capabilities of the operations for modeling a computer program can be implemented in software, firmware, hardware or some combination thereof. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer implemented method for extending a service model, the service model including specification of at least one exposed interface, wherein the exposed interface comprises a published interface defining at least the input parameters passed to the service, the output parameters from the service, the operations that can be called, and how to invoke these operations; the method comprising the steps of:
   receiving specification of information consumed by a service implementation of the service model, the information consumed comprising information that is accessed, updated, deleted and/or created by a service, the information being information that is or needs to be utilized by the service implementation without being passed through the exposed interface; and
   automatically generating an extended service model using a computer processor, the extended service model including specification of the exposed interface and specification of the information consumed by the service implementation; wherein the information consumed by the service implementation includes at least one of consumption type, non-functional annotation of the information consumed and specification of information sources; the non-functional annotation comprising a quality criterion for the information consumed by the service implementation, and the non-functional annotation also comprising a timing criterion for the information consumed specifying when the information consumed is required by the service implementation.

2. The computer implemented method of claim 1, wherein receiving specification of the information consumed by the service implementation includes:
   receiving the service implementation of the service model; and automatically determining the information consumed by the service implementation by examination of the service implementation.

3. The computer implemented method of claim 2, wherein automatically determining the information consumed by the service implementation includes analyzing code in the service implementation for information transfers outside the exposed interface.

4. The computer implemented method of claim 1, wherein receiving specification of the information consumed by the service implementation includes providing a user interface to input of the information consumed by the service implementation from a human modeler.

5. The computer implemented method of claim 1, wherein the specification of the information consumed by the service implementation of the service model includes identification of at least one information source supplying the information consumed.

6. The computer implemented method of claim 1, further comprising identifying at least one information inconsistency in the service model if the information consumed by the service model does not match at least one available information source for processing by the service implementation.

7. The computer implemented method of claim 6, wherein identifying at least one information inconsistency in the service model is performed before substantial source code for the service implementation is written.

8. The computer implemented method of claim 1, further comprising automatically allocating an information source for processing by the service implementation of the service model based, at least in part, on the information consumed by the service implementation.

9. The computer implemented method of claim 1, wherein the specification of the information consumed by the service implementation of the service model includes a consumption type, the consumption type specifying at least one of a creating the information consumed operation, a reading the information consumed operation, an updating the information consumed operation, and a deleting the information consumed operation performed by the service implementation.

10. A computer program product embodied in non-transitory computer usable memory comprising:
   computer readable program codes coupled to the computer usable medium for extending a service model, the service model including specification of at least one exposed interface, the exposed interface comprising a published interface defining at least the input parameters passed to the service, the output parameters from the service, the operations that can be called, and how to invoke these operations, and at least one endpoint for the exposed interface, the computer readable program codes configured to cause the program to:
      receive specification of information consumed by a service implementation of the service model, the information consumed comprising information that is accessed, updated, deleted and/or created by a service; the information consumed being information that is or needs to be utilized by the service implementation without being passed through the exposed interface; and automatically generate an extended service model, the extended service model including specification of the exposed interface and specification of the information consumed by the service implementation; the information consumed by the service implementation including at least one of consumption type, non-functional annotation of the information consumed and specification of information sources; the non-functional annotation comprising a quality criterion for the information consumed by the service implementation, and the non-functional annotation also comprising a timing criterion for the information consumed specifying when the information consumed is required by the service implementation.

11. The computer program product of claim 10, wherein the program code configured to receive specification of the information consumed by the service implementation includes program code configured to: receive the service implementation of the service model; and automatically determine the information consumed by the service implementation by examination of the service implementation.

12. The computer program product of claim 11, wherein the program code configured to automatically determine the information consumed by the service implementation includes program code configured to analyze code in the service implementation for information transfers outside the exposed interface.

13. The computer program product of claim 10, wherein the program code configured to receive specification of the information consumed by the service implementation includes the program code configured to provide a user interface to input of the information consumed by the service implementation from a human modeler.

14. The computer program product of claim 10, wherein the specification of the information consumed by the service implementation of the service model includes identification of at least one information source supplying the information consumed.

15. The computer implemented method of claim 10, further comprising program code configured to identify at least one information inconsistency in the service model if the information consumed by the service model does not match at least one available information source for processing by the service implementation.

16. The computer implemented method of claim 15, wherein identification of at least one information inconsistency in the service model is performed before substantial source code for the service implementation is written.

17. The computer program product of claim 10, further comprising program code configured to automatically allocate an information source for processing by the service implementation of the service model based, at least in part, on the information consumed by the service implementation.

18. The computer program product of claim 10, wherein the specification of the information consumed by the service implementation of the service model includes a consumption type, the consumption type specifying at least one of a creating the information consumed operation, a reading the information consumed operation, an updating the information consumed operation, and a deleting the information consumed operation performed by the service implementation.

* * * * *